(No Model.)
C. F. LANGFORD.
PROCESS OF AND APPARATUS FOR UTILIZING SEWAGE.
No. 251,056. Patented Dec. 20, 1881.
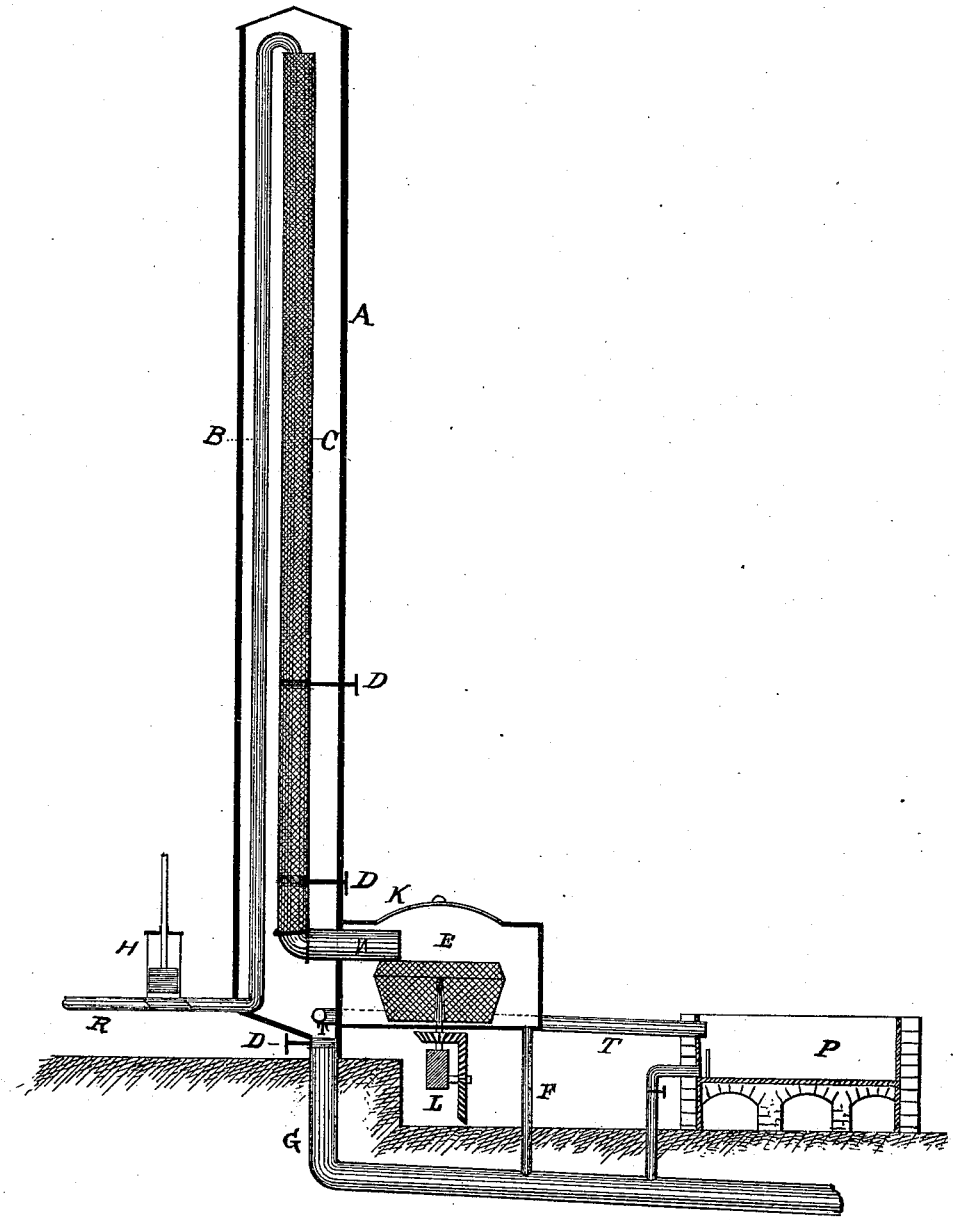
Witnesses:
Armand Kinzler
Geo. Edw. Harding
Inventor:
Charles F. Langford

UNITED STATES PATENT OFFICE.

CHARLES F. LANGFORD, OF BROOKLYN, NEW YORK.

PROCESS OF AND APPARATUS FOR UTILIZING SEWAGE.

SPECIFICATION forming part of Letters Patent No. 251,056, dated December 20, 1881.

Application filed February 28, 1881. (No model.)

*To all whom it may concern:*

Be it known that I, CHARLES F. LANGFORD, a citizen of the United States, residing at Brooklyn, in the county of Kings and State of New York, have invented a new and useful Improvement in a System for Separating and Disposing of Sewage, (for which I have not, nor have others with my knowledge or consent, obtained a patent in any foreign country,) of which the following is a specification.

My invention relates to an improved system by which the solid portion of sewage is separated from the liquid and rendered valuable as a fertilizer; and the objects of my improvements are, first, to afford facilities for separating the liquid from the solid matter; second, to create a head for forcing the liquid portion by its own pressure to any desired distance; and, third, providing a valuable fertilizer. I attain these objects by the mechanism illustrated in the accompanying drawing, which is a vertical longitudinal section of the invention, in which—

A is a tower of sufficient height to give the required fall to the sewage.

B is a pipe by which the sewage is conducted to the top of the tower A and into the wire-gauze cylinder C, which extends from the top of the tower A down to a point near the bottom, where it enters pipe N. Pipe N connects with the wire-gauze cylinder C and passes through the wall of the tower to the extractor E. Suitable valves, D' D'', are provided near the middle and lower portion, to hold in reserve any given quantity of solid matter.

E is a hydro-extractor, which is inclosed in a case, and is caused to revolve at high velocity by motion suitably communicated. The case is provided with an opening to afford access to the extractor, and which is closed by the cover K.

H is a pump for forcing the sewage through the pipe B to top of tower A and into the cylinder C.

G is a discharge-pipe for conveying the liquid from the tower A, and is suitably provided with valve D'''.

F is a drain-pipe connecting the case with the discharge-pipe G, to carry off the liquid thrown from the extractor E.

Pipe R is suitably connected with pump H and a sewer-basin.

P is a vat for precipitating any of the solid matter which may escape through the meshes of cylinder C, and is connected with tower A by the pipe T, to convey the liquid into the vat P.

The operation is as follows: The pump H draws the sewage from the sewer-basin and forces it through the pipe B to the top of the tower and into the top of cylinder C, descending through the cylinder as far as the lower valve, D, the liquid portion passing out through the meshes of the cylinder. When the space between the valves D' D'' is filled with solid matter the upper valve is closed and the lower valve opened, when the solid matter descends through the cylinder to the extractor E, where what remains of the liquid is extracted by the centrifugal force of the revolving extractor. Suitable bags of cheap material are provided, which line the interior of the extractor, and by which the matter dried is removed. The liquid which escapes through the meshes of cylinder C is conveyed through the pipe G by its own head to any required distance. If desired, the liquid may first be led into the vat P, where any solid matter may be precipitated.

The valve D''' in pipe G may be employed to cut off the flow of the liquid, and, if desired, the tower flooded, and thereby remove any refuse matter which may accumulate upon the inside or outside of the cylinder C.

The liquid thrown from the extractor E into the case is conveyed by the pipe F into pipe G. The liquid in the vat P is conveyed by a pipe into pipe G. The matter precipitated in vat P may be removed in any suitable manner.

In case that it is desired, the fluid contents of the tower A may be drawn off into vats and chemically treated before being discharged, by which the supernatant fluid is rendered perfectly clear and all foreign matters precipitated.

I do not confine myself to using the cylinder in an upright position, for where a sewer has much descent the cylinder can be placed at its mouth and the sewage allowed to empty into it, producing the separation of the fluids from the solids in the same manner as if the sewage were forced up, as set forth above.

What I claim, and desire to secure by Letters Patent, is—

1. The method of separating fluids from solid matter, which consists in causing the sewage matters to pass into a tower provided with a central wire-gauze cylinder or strainer placed vertically, or so that the flow of the material is directed by gravity through a wire-gauze cylinder, whereby most of the fluid portion of the sewage is removed, and the solid matters may be further dried by an extractor and centrifugal action and then delivered into a vat or receptacle.

2. In an apparatus for separating the materials of sewage, the wire-gauze cylinder C, in combination with pipe N and the hydro-extractor E, for the purpose set forth.

3. The precipitating-vat P and pipe T, in combination with the wire-gauze cylinder and tower A, for the purpose set forth.

CHARLES F. LANGFORD.

Witnesses:
JOSEPH WELLS,
FRED. S. WELLS.